United States Patent [19]

Beretta et al.

[11] 4,207,427
[45] Jun. 10, 1980

[54] ELECTRICAL POWER CABLE WITH STRANDED INSULATED WIRES

[75] Inventors: Germano Beretta, Monza; Cesare Seveso, Cinisello; Giulio Tuci, Milan, all of Italy

[73] Assignee: Industrie Pirelli Societa per Azioni, Milan, Italy

[21] Appl. No.: 886,630

[22] Filed: Mar. 15, 1978

[30] Foreign Application Priority Data

Mar. 16, 1977 [IT] Italy ............................... 21277 A/77

[51] Int. Cl.² ............................................. H01B 7/30
[52] U.S. Cl. .............................. 174/26 R; 174/25 R; 174/110 SR; 174/128 R
[58] Field of Search ............ 174/25 R, 26 R, 110 SR, 174/128, 131 B

[56] References Cited

U.S. PATENT DOCUMENTS

| | | | |
|---|---|---|---|
| 1,904,162 | 4/1933 | Milliken | 174/128 R |
| 2,085,995 | 7/1937 | Patnode | 174/110 SR |
| 2,286,759 | 6/1942 | Patnode | 174/110 SR |
| 2,307,588 | 1/1943 | Jackson | 174/110 SR |
| 2,308,638 | 1/1943 | Balthis | 174/110 SR |
| 2,314,694 | 3/1943 | Dodds | 174/25 R |
| 2,972,658 | 2/1961 | Lapsley | 174/128 R |
| 3,069,379 | 12/1962 | Lavin | 174/110 SR |
| 3,077,462 | 2/1963 | Fitzhugh | 174/110 SR |
| 3,164,670 | 1/1965 | Ege | 174/128 R |

FOREIGN PATENT DOCUMENTS 571677 3/1959 Canada ........................................ 174/110

OTHER PUBLICATIONS

Sykes, J. H. Discuss EHV Underground Cable System, Electrical World, vol. 163, No. 20, May 17, 1965, p. 114.

*Primary Examiner*—Richard R. Kucia
*Attorney, Agent, or Firm*—Brooks, Haidt, Haffner & Delahunty

[57] ABSTRACT

An electric power cable having a Milliken-type conductor comprising at least four sectors, the conductor being paper-insulated and oil filled and each sector comprising metal wires stranded together. Each wire is covered with a layer of a cross-linked synthetic resin having a thermal classification of 120° C., a CEI resistance to abrasion of at least 50 cycles, a CEI thermal pressure value higher than 170° C. and an insulating oil contaminating effect of substantially zero, such resin also being substantially completely volatizable by the heat used for joining cables by welding. Preferred resins are a polyvinyl-acetal resin, such as a polyvinyl-formal resin, cross-linked with a phenol resin and, optionally, a melamine resin and such with the addition of a blocked isocyanate.

6 Claims, 1 Drawing Figure

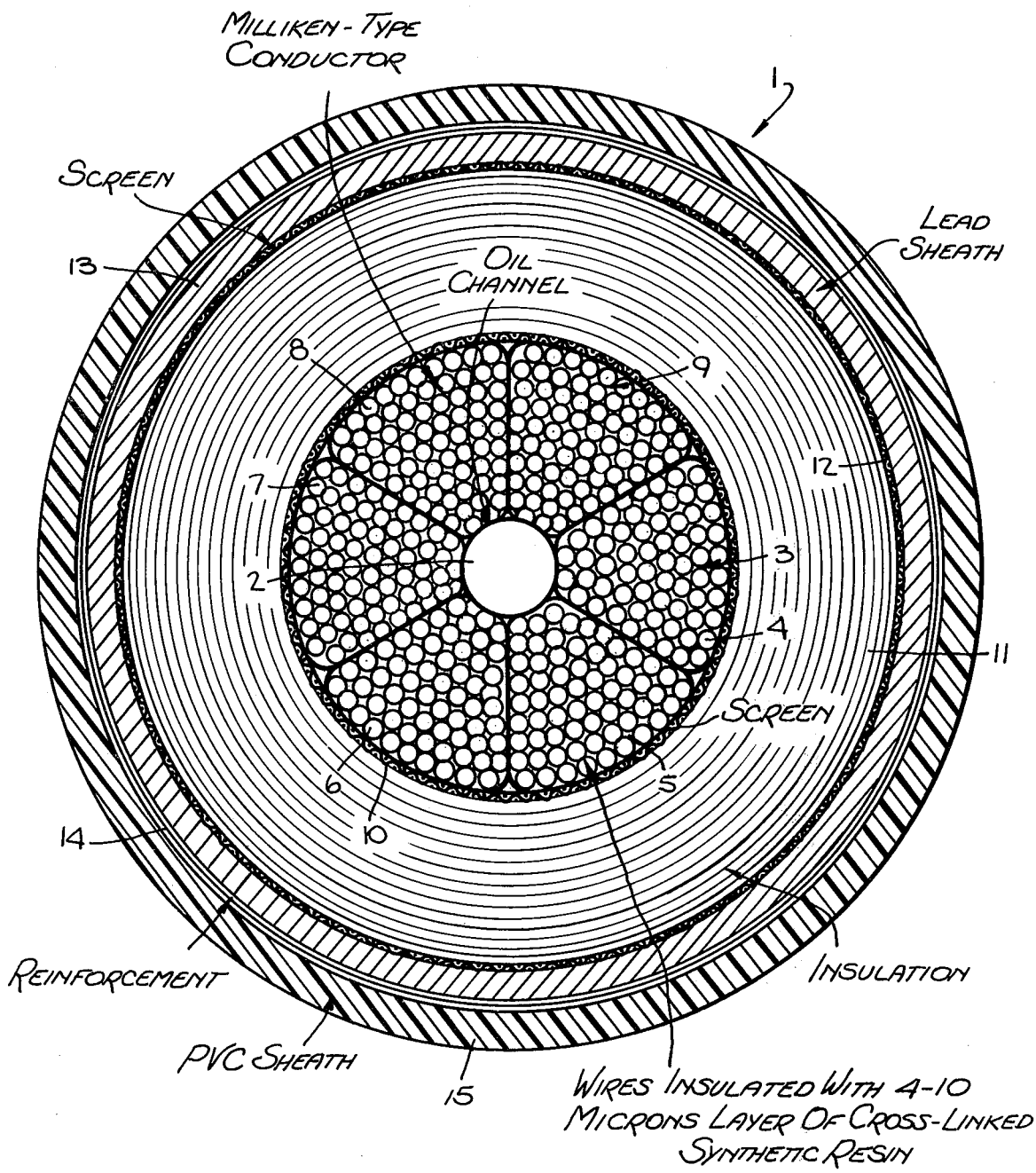

ELECTRICAL POWER CABLE WITH STRANDED INSULATED WIRES

The present invention relates to electrical cables, and in particular, to paper-insulated and oil-filled, alternating current, power cables having a Milliken-type conductor.

The ever increasing trend of using large-size electrical conductors in alternating current, power cables in order to increase the transmitted power is already known. On the other hand, it is also known that serious disadvantageous effects take place in said conductors, due to the "skin effect" and to the "proximity effect" which, increasing the actual resistance of the conductors themselves, prejudice, in many cases, any advantage deriving from the increased size of the conductors.

In order to minimize these effects, use is generally made of the Milliken-type conductor which consists, as is known, of four or more sector-shaped conductive elements, separately stranded, and arranged to form a conductor of circular section. Each sector is generally formed of copper wires stranded together. This arrangement is able to counterbalance the "skin effect" and the "proximity effect", since it approximately balances the inductive voltage drop in each of the wires. However, it is to be taken into account that, when there is a passage of current from one wire to the other, the effectiveness of said arrangement is considerably reduced. Consequently, it is of great importance to provide conductive elements of this type made in such a way that the passage of current from one wire to the other is reduced to a minimum.

It is known that, to obtain a high contact resistance between adjacent conductive wires, resort has been had to covering of the wires with a layer of appropriate insulating material which, in order to obtain the maximum possible size reduction, must have a minimum thickness, of the order of 1 to 10 microns. However, the insulating material intended to form such a covering ought to comply with so many different technical requirements that, in practice, said expedient has not yet been carried into effect. In fact, account is to be taken of the need for the insulating covering to remain unaffected by the contact with the paper and with the fluid oil impregnating the cable, so as to prevent any contamination of the oil by the degradation products of said covering. Secondly, consideration is to be taken of the need for the covering to adhere permanently to the conductive wire and to mechanically withstand the considerable stresses to which the conductors are subjected during their handling and stranding, so as to ensure a good insulation on the entire contacting surface of said conductors. Finally, the possibility that joints will be made between cables of this type requires the choice of a covering material which does not involve any drawback at the time of welding, namely, a covering is needed which may be easily removed or totally carbonized without causing any contamination of the fluid oil.

It would appear that, since the problem is that of applying insulating coverings in layers of minimum thickness, a solution could be found in the use of the so-called "insulating enamels", namely, of thermoplastic or thermosetting synthetic resins able to form films on the wires and already widely known in the form of resins applied to the conductors used to form windings in electrical machines or in transformers.

However, it is to be noted that, in said field, the thicknesses normally adopted for the layers of insulating enamel, in the range of wire diameters analogous to those of the Milliken-type wires, are of the order of 80 to 100 microns or in other words, much greater than the thicknesses to be used for the Milliken-type conductors. Consequently, some of the above-mentioned problems, such as the adhesion of the covering to the conductive wire and its mechanical resistance, can be easily solved by applying a plurality of layers of two or more resins having different physical and mechanical properties.

Moreover, with respect to the specific use of enamelled conductors in transformers, where there also is a need that the conductor covering not contaminate the insulating fluid oil, it is to be noted that the ambient where the insulating enamel operates is less demanding than that of the power cables. The consequence is that the application to the Milliken-type conductors of an enamel which behaves satisfactorily on conductors to be employed in transformers in their ambients is unsuitable for Milliken-type conductors of power cables.

In fact, it has been ascertained that the already known insulating enamels applied to the conductors for windings of electric machines and for transformers cannot be applied equally well to the Milliken-type conductors, for lack of one or more necessary features. Thus, the polyurethane enamels have shown a poor mechanical resistance and an unacceptable tendency to degradation in contact with the paper and the insulating oil during service and to cause a contamination of the oil itself. Equally polluting are the polyester-base enamels, since, as is known, they are easily hydrolyzable.

The polyamide-imide enamels have notoriously a poor adhesion to the metal wire, and the polyamide enamels have a low mechanical resistance. Finally, the epoxy enamels can be hardly applied on a metal wire in layers as thin as those necessary in the field of the Milliken-type conductors since they result in extremely irregular surfaces.

The present invention has, as one object, the provision of an insulating enamel whose physical and mechanical features are such that, when it is applied as a layer of small thickness on the conductive wires constituting the Milliken-type conductors of a power cable, all the above-mentioned mentioned requirements are complied with.

Accordingly, an object of the present invention is a power cable comprising a Milliken-type conductor of circular cross section consisting of at least four sector-shaped conductive elements, said conductor being paper-insulated and oil-filled, each of said elements comprising conductive metal wires stranded together and each of said wires having an insulating covering having a thickness ranging between 4 and 10 microns and having, with respect to the passage of current from one conductive metal wire to the other, a contact resistance which is high with respect to the longitudinal resistance of said conductive metal wires. Said insulating covering consists of a cross-linked synthetic resin having a thermal classification of 120° C., a resistance to bidirectional abrasion, in accordance with CEI (Comitato Elettrotecnico Italiano) 55.1 standards, at least equal to 50 cycles, a value of thermal pressure, in accordance with said CEI 55.1 standards, higher than 170° C., and a contamination effect on fluid oil, after aging in a closed system comprising said oil and said insulating paper, which is practically nil, said resin being able to volatilize in the welding zone in a practically complete manner at the temperatures existing (at least 500° C.) during any welding together of the conductors. We have discovered that a synthetic resin having the above mentioned physical and mechanical properties provides an insulating covering which better complies with the various requirements to be met in the manufacture, joining and service life of a cable provided with a Milliken-type conductor.

The single FIGURE of the accompanying drawing illustrates, in cross-section, one example of an electric power cable comprising a Milliken-type conductor in which the individual wires are insulated in accordance with the invention.

The cable 1 illustrated in the drawing has a central channel 2 for the passage of an insulating oil. The channel 2 is surrounded by a Milliken-type conductor 3 comprising six sectors 4–9, each sector including a plurality of wires each of which is insulated in accordance with the invention. A conductive screen 10 extends around the sectors 4–9, and is, in turn, surrounded by insulation 11 such as layers of paper. Another conductive screen 12 surrounds the insulation 11 and is surrounded by a lead sheath 13. A conventional reinforcing layer 14 extends around the lead sheath 13 and the layer 14 is covered by a sheath 15 of plastics material, such as polyvinylchloride.

As described hereinbefore, the wires which form the sectors 4–9 are each covered with a layer of a cross-linked synthetic resin four to ten microns thick so that the contact resistance between the wires is high, e.g. many times, the longitudinal resistance of the wires. The resin has certain physical and thermal characteristics which make it satisfactory under the handling and operating conditions, causes substantially no contamination of the insulating oil and substantially completely volatizes when it is subjected to the temperatures encountered when the conductor 3 of one cable is brazed or welded to the conductor 3 of another cable.

More particularly, said resin is defined, with respect to its physical and mechanical properties, according to its thermal classification (i.e. the temperature which the resin resists over a time period of 20,000 hours) and according to its resistance to bidirectional abrasion and to thermal pressure. As is known, the resistance to bidirectional abrasion in accordance with CEI 55.1 standards is measured by means of an appropriate steel needle which, placed at a right angle with respect to the longitudinal axis of the conductive wire covered with a layer of pre-established thickness of the resin under test, causes an abrasive action on the resin by moving reciprocally along the axis of the conductive wire under a progressively increasing load. The number of the displacement cycles of the needle until the occurrence of a short circuit due to the needle coming into contact with the conductive wire, gives the index of the mechanical resistance of the resin.

On the other hand, with respect to the evaluation of the thermal pressure in accordance with CEI 55.1 standards, this is carried out, as is known, by placing two conductive wires, covered with the resin under test and in crossed relation to each other at a right angle, subjecting them to a thermal conditioning at 170° C., for a pre-established time (in the present case two minutes), and then loading them with a pre-established weight for a pre-established time (1 minute) and determining that a short circuit between the wires has not taken place.

In connection with the contamination of the fluid oil after the aging of the conductive wire covered with the resin forming the object of the present invention, it is to be remarked that said feature is of great importance in connection with the service life of the cable comprising a Milliken-type conductor.

In the field of the present invention, the contamination factor is evaluated after two types of aging tests, both effected by placing the conductive copper wire, covered with a layer of resin of a thickness ranging between 4 and 10 micron, in a closed chamber comprising both the paper and the oil intended to form the cable insulation. In one test, said system is subjected to a heat treatment, at a temperature of 140° C. for 30 days, whereas, in the second test, the system is subjected to the same heat treatment for 7 days, followed by a heat treatment at 200° C. for two hours. In both types of tests, when the test is over, the loss factor of the fluid oil contained in the chamber is measured.

As stated, the cross-linked synthetic resin intended to form the covering of the wires of a Milliken-type conductor according to the present invention involves a contamination factor of the fluid oil, as defined above, which is practically zero.

One synthetic resin, the preferred resin, possessing all of the above-mentioned physical and mechanical properties is a polyvinyl-acetal resin, such as a polyvinyl-formal resin cross-linked with a phenol resin and, optionally, a melamine resin, in percentages of 10 to 80 parts and 0 to 15 parts, respectively, for each 100 parts of polyvinyl-acetal resin. All parts, percentages, proportions and ratios are by weight unless otherwise stated.

In another preferred embodiment said polyvinylacetal resin is cross-linked by said phenol resin and, optionally, said melamine resin with the addition of from 10 to 75 parts of a blocked isocyanate for each 100 parts of polyvinylacetal resin.

Said polyvinyl-acetal resin is a condensation product of a vinylic compound and lower alkyl aldehyde, such as a polyvinyl-formal resin obtained by the condensation of formaldehyde with a hydrolysis product of polyvinyl acetate. The phenol resin is a condensation product of a phenolic compound, including polyhydric and alkyl-substituted phenols and formaldehyde, such as phenol and formaldehyde and preferably, cresol and formaldehyde, and the like. The melamine resin is a condensation product of a melamine with a lower alkyl aldehyde, such as formaldehyde, acetaldehyde, and the like. The desireable blocked isocyanates are polyisocyanates which are blocked with a hydric material, preferably a phenolic compound. Thus a preferred blocked isocyanate is toluene diisocyanate blocked with phenol.

An example of a composition of the synthetic resin as defined above, which can be used to form the insulating covering of the Milliken-type conductors is the following:

| | |
|---|---|
| polyvinyl-formal resin[1] | 100 parts by weight |
| cresol-formaldehyde resin | 14 parts by weight |
| melamine-formaldehyde resin[2] | 11 parts by weight |
| blocked isocyanate[3] | 60 parts by weight |
| solvent (xylenol) | 553 parts by weight |
| diluent | 368 parts by weight |

[1] "Formvar" resin, sold by Monsanto
[2] "Resimene 882", sold by Monsanto
[3] "Desmodue AP", sold by Farbenfabriken Bayer A.G.

The so-formed composition, having a viscosity ranging between 500 and 3,000 centipoises, is applied on the conductive copper wires, having a diameter ranging between 0.30 and 5 mm, intended to form the Milliken-type conductor. Preferably, said wires are caused to pass through a bath containing the above described composition. The so-covered wires coming from the bath are subjected to a heat treatment to set the resin, such as by passage through a first zone in an oven heated at a temperature of about 300° C. and then through a second zone in the oven heated at a temperature ranging between 400° C. and 450° C.

The cross-linked polyvinyl-acetal resin described in the present application as an insulating covering for the conductive wires intended to form the strand of the Milliken-type conductor, as described, is the one which better complies with the requisites imposed by the manufacturing and the service conditions of cables of this kind, as has been ascertained by tests effected on conductive wires covered in this way. In fact, said resin has proved to have the following features:

| | |
|---|---|
| Thermal classification | 120° C. |
| Dielectric strength measured in accordance with CEI 55.1 standards | 120 KV/mm |
| Resistance to bidirectional abrasion (CEI 55.1 standards) | 150 cycles |
| Thermal pressure value (CEI 55.1 standards) | 170° C. |

The contamination of decylbenzene with aging of the so covered wire is as follows:

| | loss factor | |
|---|---|---|
| | at room temp. | at 100° C. |
| At 140° C. for 30 days: | | |
| - resin-covered wire/decylbenzene/paper system | $<1.10^{-4}$ | $3.10^{-4}$ |
| - decylbenzene/paper system alone | $<1.10^{-4}$ | $1.10^{-4}$ |
| at 140° C. for 7 days, followed by treatment at 200° C. for 2 hours: | | |
| - resin-covered wire/decylbenzene/paper system | $<1.10^{-4}$ | $4.10^{-4}$ |
| - decylbenzene/paper system alone | $<1.10^{-4}$ | $1.10^{-4}$ |

From the above it will be noted that, at the end of the aging test carried out with the wire covered with the above described resin, and with decylbenzene and paper in a chamber, the loss factor of the decylbenzene is practically the same as that resulting at the end of the aging test carried out with decylbenzene and paper alone. Therefore, it can be concluded that the contamination of decylbenzene caused by the resin under examination is substantially nil.

Moreover, it is to be noted that it has been found that the described resin has been found to possess a high adhesion to the conductive wire. Further, during the joining of the conductive wires, preferably, by means of the M.I.G. (metal/inert gas) welding technique, it has been ascertained that said resin volatilizes in a practically total manner.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In a power cable comprising a Milliken-type conductor comprising at least four sector-shaped conductive elements, said conductor being paper-insulated and oil-filled, each of said conductive elements comprising conductive metal wires stranded together, each of said wires having an insulating covering which provides a contact resistance radially which is high with respect to the longitudinal resistance of said wires for reducing current flow from wire to wire, an improved insulating covering which is a cross-linked synthetic resin having a thickness in the range from 4 to 10 microns, a thermal classification of at least 120° C., i.e. resists breakdown for at least 20,000 hours when subjected to a temperature of 120° C., a resistance to bidirectional abrasion at least equal to 50 cycles in accordance with Comitato Elettrotecnico Italiano Standard No. 55.1, a value of thermal pressure higher than 170° C. in accordance with Comitato Elettrotecnico Italiano Standard No. 55.1, and a contamination effect on fluid oil which is substantially nil, said resin being substantially completely volatizable by heating at temperatures encountered with the welding of the conductor of one such cable to the conductor of another such cable and said resin being a polyvinyl-acetal resin cross-linked with a phenol-aldehyde resin and, optionally, a melamine resin in percentages by weight in the range from 10 and 80 parts of the phenol-aldehyde resin, 0 and 15 parts of the melamine resin and 100 parts by weight of said polyvinylacetal resin.

2. A cable as set forth in claim 1, wherein said cross-linked synthetic resin also comprises a blocked isocyanate in an amount in the range from 10 to 75 parts to 100 parts of polyvinyl-acetal resin.

3. A cable as set forth in claim 2, wherein said blocked isocyanate is a phenol-blocked toluene diisocyanate.

4. A cable as set forth in claim 1, wherein said polyvinyl-acetal resin is the condensation product of a formaldehyde with a hydrolysis product of a polyvinyl-acetate.

5. A cable as set forth in claim 1, wherein said phenol-aldehyde resin is the condensation product of cresol with formaldehyde.

6. A cable as set forth in claim 1, wherein said melamine resin is a condensation product of melamine and formaldehyde.

* * * * *